United States Patent
Fricasse

(10) Patent No.: US 9,780,632 B2
(45) Date of Patent: Oct. 3, 2017

(54) SYNCHRONOUS ELECTRIC MACHINE WITH TWO ROTORS

(71) Applicant: C.R.F. Societa Consortile per Azioni, Orbassano (Turin) (IT)

(72) Inventor: Antonio Fricasse, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 55 days.

(21) Appl. No.: 14/874,821

(22) Filed: Oct. 5, 2015

(65) Prior Publication Data

US 2016/0099636 A1    Apr. 7, 2016

(30) Foreign Application Priority Data

Oct. 7, 2014  (EP) .................................... 14187894

(51) Int. Cl.
*H02K 16/02* (2006.01)
*H02K 3/28* (2006.01)
*B60K 6/26* (2007.10)
*B60K 6/365* (2007.10)
*B60K 6/543* (2007.10)
(Continued)

(52) U.S. Cl.
CPC ............... *H02K 16/02* (2013.01); *B60K 6/26* (2013.01); *B60K 6/365* (2013.01); *B60K 6/543* (2013.01); *H02K 3/28* (2013.01); *H02K 21/12* (2013.01); *H02K 51/00* (2013.01); *H02K 7/116* (2013.01);
(Continued)

(58) Field of Classification Search
CPC ............. H02K 16/02; H02K 3/28; B60K 6/26
See application file for complete search history.

(56) References Cited

U.S. PATENT DOCUMENTS 6,211,597 B1 *  4/2001  Nakano ................. H02K 16/02
                                                                   310/114
6,373,160 B1    4/2002  Schrodl
(Continued)

FOREIGN PATENT DOCUMENTS

EP          0945963         9/1999
EP          0945965         9/1999
(Continued)

OTHER PUBLICATIONS

Search Report for European Patent Application No. 14187894 dated Mar. 30, 2015, 3 pages.

*Primary Examiner* — Brian Swenson
(74) *Attorney, Agent, or Firm* — RMCK Law Group, PLC

(57) ABSTRACT

A synchronous electric machine includes a stator having a plurality of teeth with first and second active surfaces; first and second stator windings having respective series of first and second coils wound on said teeth; first and second rotors having respective series of first and second permanent magnets with alternate polarities and facing said respective first and second active surfaces; wherein the first coils and the second coils of each stator winding are arranged in pairs, with two coils of each pair offset from each other by a predetermined angle; and wherein, during operation as a motor, two first coils of each pair produce concordant torque contributions on the first rotor and discordant torque contributions on the second rotor and two second coils of each pair produce concordant torque contributions on the second rotor and discordant torque contributions on the first rotor.

9 Claims, 9 Drawing Sheets

(51) Int. Cl.
  *H02K 21/12* (2006.01)
  *H02K 51/00* (2006.01)
  H02K 7/116 (2006.01)
  H02K 9/19 (2006.01)

(52) U.S. Cl.
  CPC ............ *H02K 9/19* (2013.01); *Y10S 903/906* (2013.01); *Y10S 903/91* (2013.01); *Y10S 903/918* (2013.01)

(56) References Cited

U.S. PATENT DOCUMENTS

| | | | | |
|---|---|---|---|---|
| 9,150,092 B2* | 10/2015 | Murakami | ............... | B60K 6/26 |
| 2006/0175923 A1* | 8/2006 | Abou Akar | ............ | H02K 1/278 |
| | | | | 310/114 |
| 2007/0296296 A1* | 12/2007 | Masuda | .................... | F03C 4/00 |
| | | | | 310/119 |
| 2016/0079836 A1* | 3/2016 | Aoyama | ............... | H02K 16/02 |
| | | | | 310/68 D |
| 2016/0099618 A1* | 4/2016 | Kusase | ................. | H02K 16/02 |
| | | | | 310/46 |
| 2016/0248307 A1* | 8/2016 | Kubota | ................. | H02K 16/02 |

FOREIGN PATENT DOCUMENTS

| | | |
|---|---|---|
| EP | 1456048 | 9/2004 |
| EP | 1480316 | 11/2004 |
| EP | 1673848 | 6/2006 |
| GB | 2353147 | 2/2001 |
| JP | 2013106492 | 9/2004 |

* cited by examiner

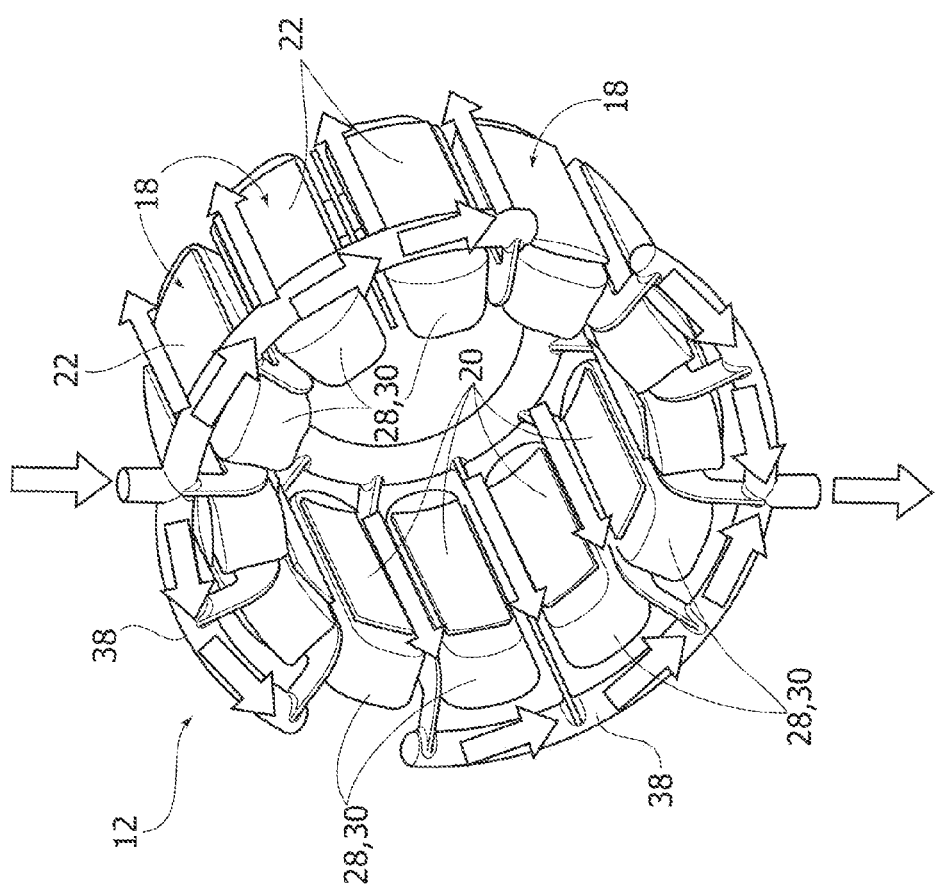

US 9,780,632 B2

SYNCHRONOUS ELECTRIC MACHINE WITH TWO ROTORS

CROSS REFERENCE TO RELATED APPLICATIONS

This application claims priority to European Patent Application No. 14187894.2 filed on Oct. 7, 2014, the entire disclosure of which is incorporated herein by reference.

FIELD OF THE INVENTION

The present invention relates to a synchronous electric machine with two rotors.

The invention has been developed for use, in particular, as a continuously variable electromagnetic transmission for vehicles.

BACKGROUND OF THE INVENTION

EP-A-1456048 describes a transmission system with a continuously variable transmission ratio comprising an electric machine with a stator and two coaxial rotors. The stator is external and the two rotors are arranged concentrically inside the stator. The first rotor is provided with a polyphase winding and the second rotor carries a plurality of magnets that cooperate with the first rotor winding and the stator winding. A first and a second inverter are connected to the first rotor winding and to the stator winding, respectively.

This solution has several drawbacks, including the need for power supply brushes for the first rotor winding and the need to provide a coolant system of the first rotor, which is integrated into the shaft of the rotating rotor.

EP-A-0945963 describes an electric machine comprising a first rotor having a plurality of magnetic poles, a second rotor having a plurality of magnetic poles and supported in a freely rotatable manner, coaxially to the first rotor, and a stator comprising a winding formed by a plurality of coils arranged at equal regular intervals. The stator winding is supplied with a first alternating current, which forms a number of rotating magnetic fields equal to the number of magnetic poles of the first rotor, and with a second alternating current, which forms rotating magnetic fields of a number equal to the number of magnetic poles of the second rotor. A controller supplies the stator winding with a composite electric current comprising the first and the second alternating currents.

The drawback of this solution is that the two rotors are not electromagnetically independent of each other, and it is therefore very difficult to avoid a torque transmission to the second rotor when the stator winding is supplied with the driving current of the first rotor, and vice versa.

EP-A-1673848 describes a double rotor electric machine with axial flux, comprising two disc-shaped rotors arranged on opposite sides of an intermediate stator equipped with a stator winding. Each of the rotors carries four permanent magnets arranged at 90°, with the same polarity on each rotor. In this case as well, the two rotors are not electromagnetically independent of each other regarding the magnetic flux generated by the stator winding.

OBJECT AND SUMMARY OF THE INVENTION

The object of the present invention is to provide a double rotor electric machine, which overcomes the problems of the prior art. In particular, the object of the invention is to provide a double rotor electric machine in which the two rotors are electromagnetically independent of the stator magnetic flux.

According to the present invention, this object is achieved by an electric machine having the characteristics forming the subject of the claims.

The claims form an integral part of the disclosure given in relation to the invention.

BRIEF DESCRIPTION OF THE DRAWINGS

The present invention will now be described in detail with reference to the accompanying drawings, given purely by way of non-limiting example, wherein:

FIG. 3 is a schematic perspective view illustrating the coolant circuit of the stator of the machine of FIG. 2.

DETAILED DESCRIPTION

Figure 1:
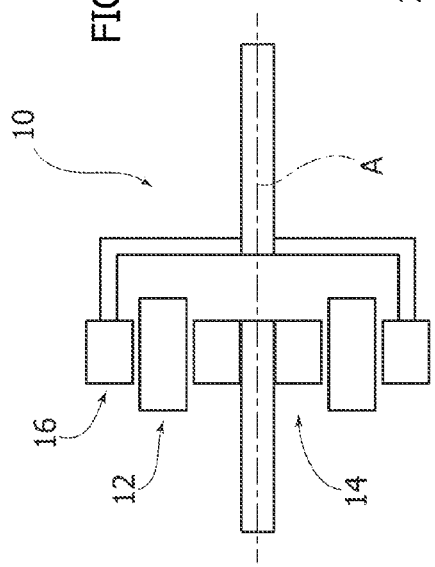
FIG. 1 is a schematic view of an electric machine according to the present invention.
Figure 2:
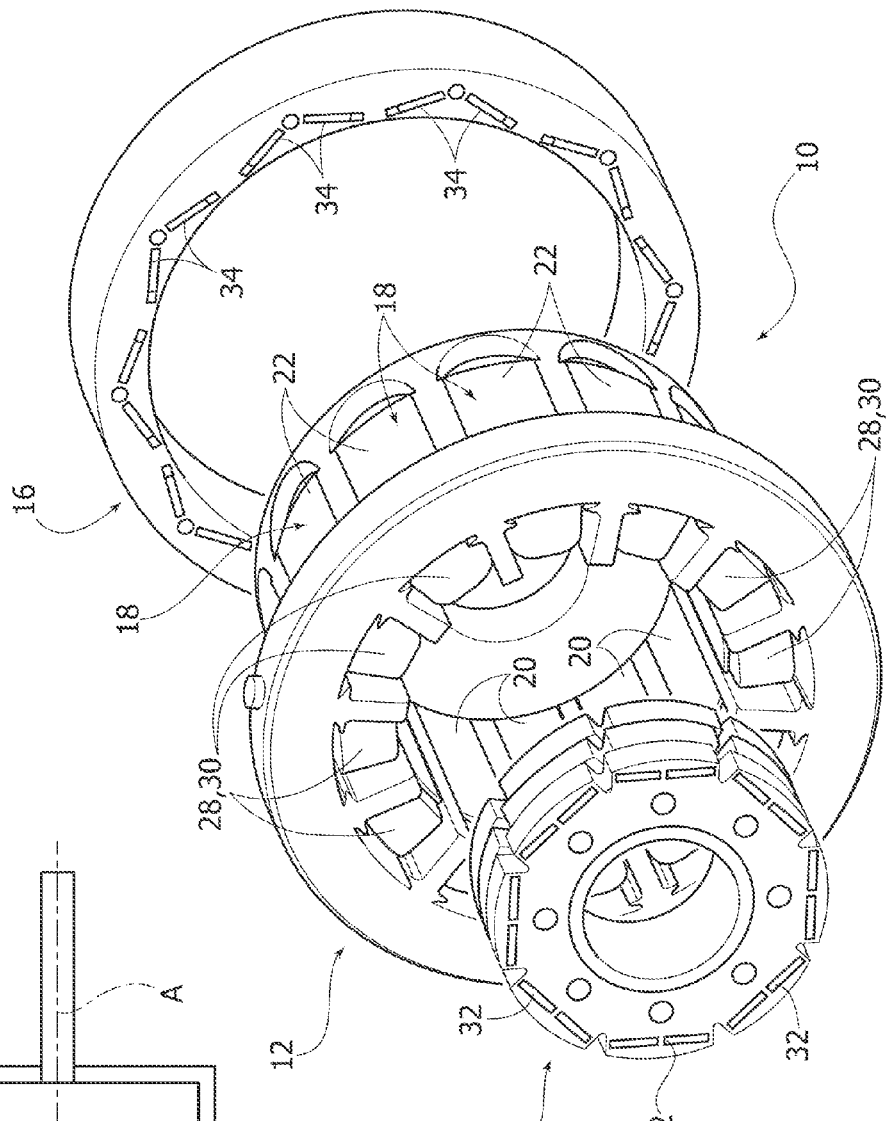
FIG. 2 is an exploded perspective view of the electric machine of FIG. 1.

In FIG. 1, numeral 10 indicates a synchronous electric machine with two rotors. The electric machine 10 comprises a stator 12, a first rotor 14 and a second rotor 16. The first and the second rotors 14, 16 are rotatable, independently of each other, around a common axis A. In the embodiment illustrated in FIGS. 1 and 2, the electric machine 10 has a radial flux arrangement. The stator 12 has an annular shape, the first rotor 14 is coaxially arranged inside the stator 12 and the second rotor 16 is coaxially arranged outside the stator 12.

Figure 4:
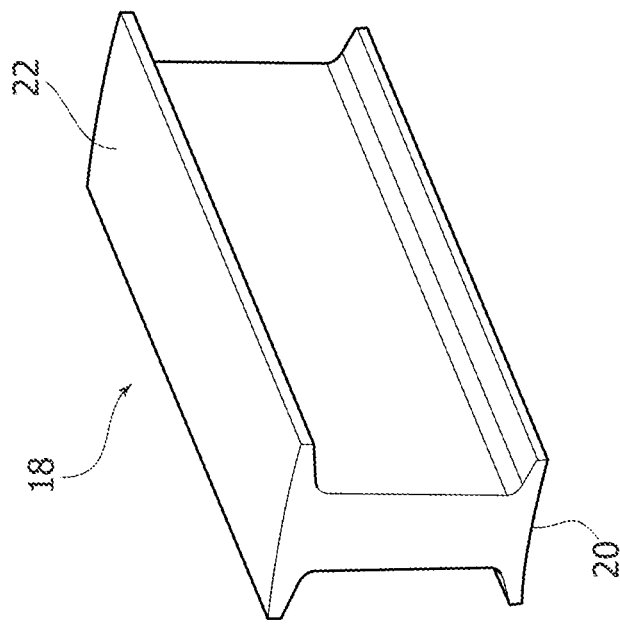
FIG. 4 is a perspective view illustrating one of the teeth of the stator of the machine of FIG. 2.

With reference to FIGS. 2 to 5, the stator 12 comprises a plurality of teeth 18 arranged at equal angular intervals. As is illustrated in FIG. 4, each tooth 18 has an essentially I-shaped cross-section and has first and second active surfaces 20, 22. The first active surfaces 20 are arranged on an inner cylindrical surface and the second active surfaces 22 are arranged on an outer cylindrical surface.

Figure 6:
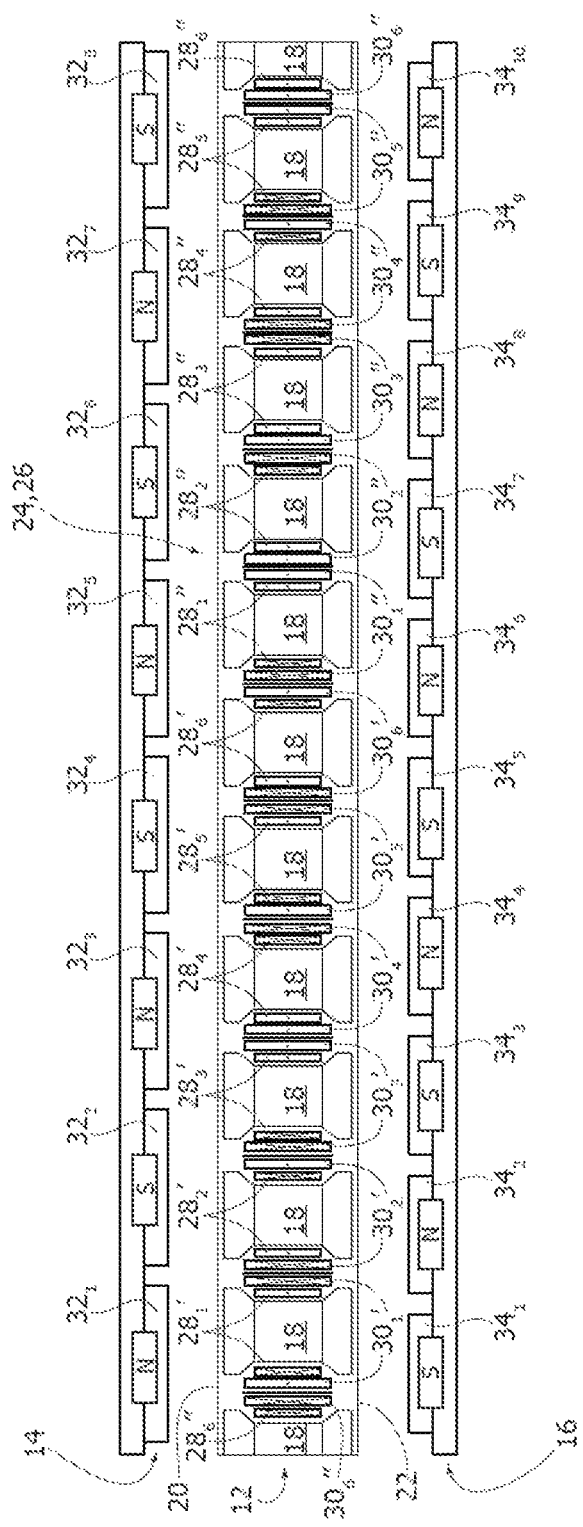
FIG. 6 is a schematic view illustrating the plane development of the machine according to the invention.
Figure 7:
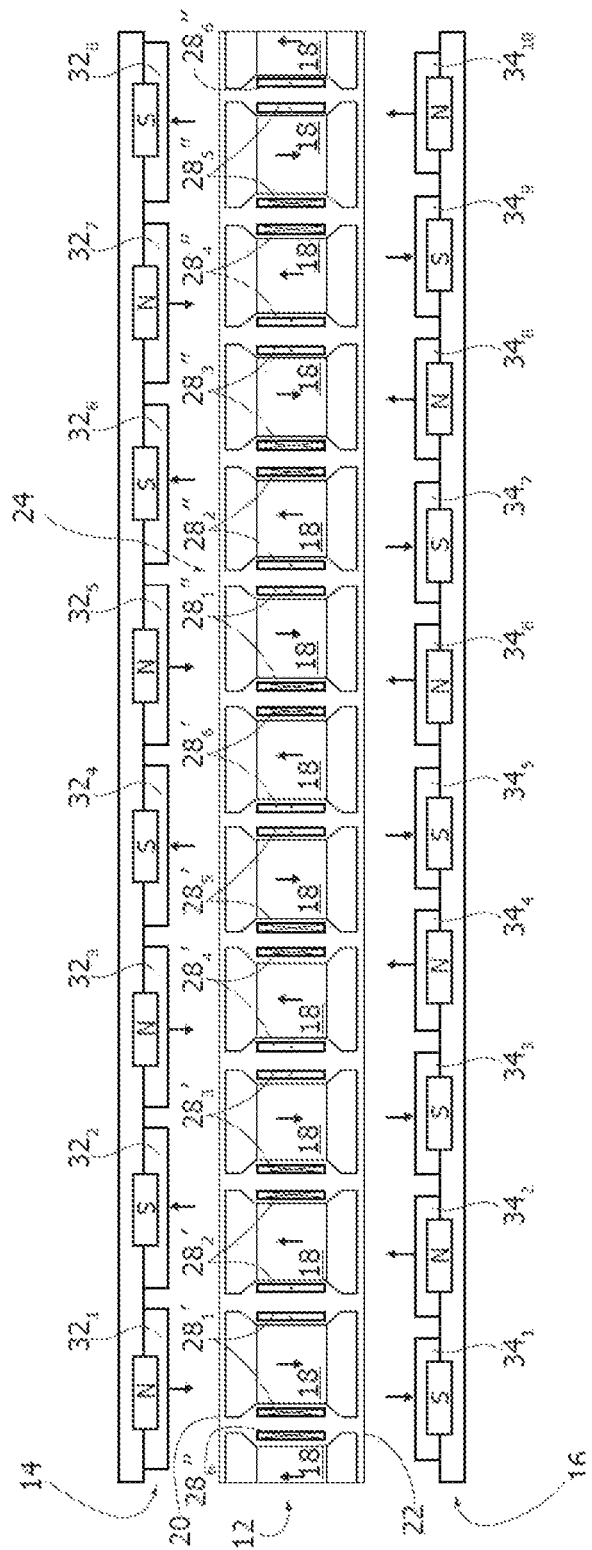
FIGS. 7 and 8 are views analogous to FIG. 6, separately illustrating the arrangement of a first and a second stator winding.
Figure 8:
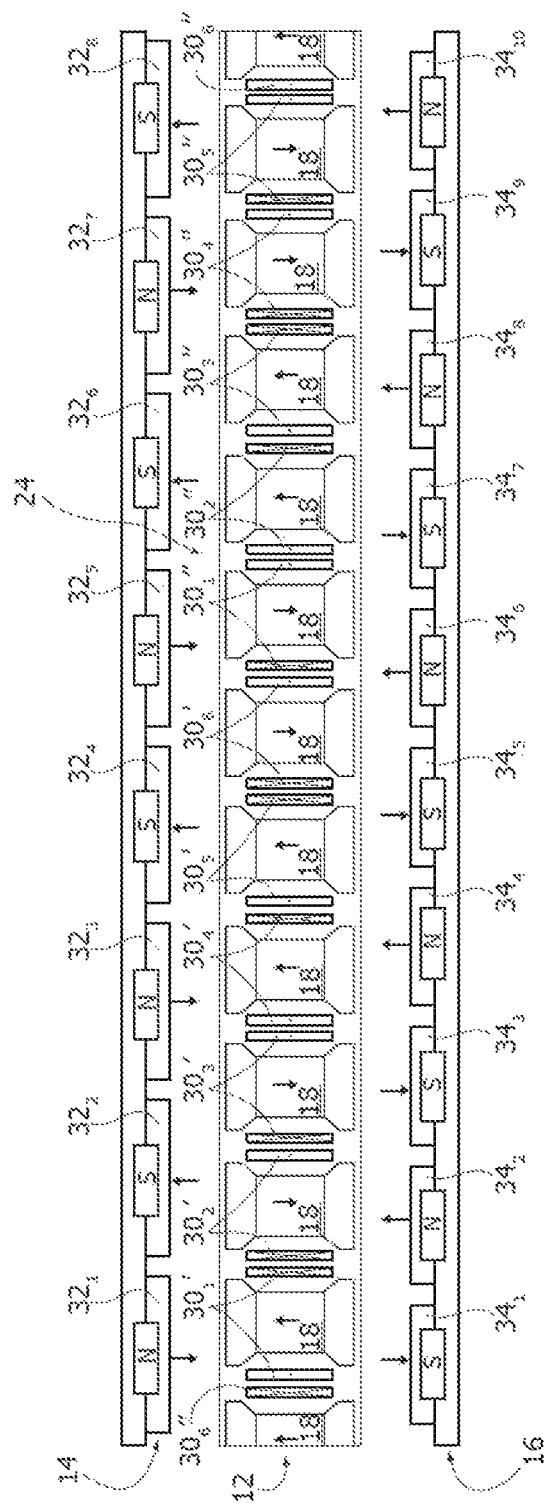

With reference to FIGS. 6, 7 and 8, the stator 12 comprises a first stator winding 24 and a second stator winding 26. Each stator winding 24, 26 is formed by a number of coils equal to the number of teeth 18. Each tooth 18 carries a coil of the first stator winding 24 and a coil of the second stator winding 26. Each of the two stator windings 24, 26 has an even number of coils arranged in pairs, with the coils of each pair offset from each other by a predetermined angle. In the illustrated example, the first stator winding 24 and the second stator winding 26 each have 12 coils arranged in six pairs, with the coils of each pair offset from each other by 180°. In FIGS. 6-8, numeral 28 indicates the coils of the first stator winding 24 and numeral 30 indicates the coils of the second stator winding 26. The subscripts 1-6 indicate the six pairs of coils, and the coils of each pair are labeled with the superscript ' or ". The first stator winding 24 is formed by the coils $28_1'$, $28_2'$, $28_3'$, $28_4'$, $28_5'$, $28_6'$, $28_1''$, $28_2''$, $28_3''$, $28_4''$, $28_5''$, and $28_6''$. The second stator winding 26 is formed by the coils $30_1'$, $30_2'$, $30_3'$, $30_4'$, $30_5'$, $30_6'$, $30_1''$, $30_2''$, $30_3''$, $30_4''$, $30_5''$, and $30_1''$. The two coils of each pair $28_i'$, $28_i''$ and $30_i'$, $30_i''$ (where is comprised between 1 and 6) are spaced apart by 5 teeth 18.

The first rotor 14 has a series of first permanent magnets 32. In the illustrated example, the first rotor 14 has 8 permanent magnets 32, labeled with $32_1$, $32_2$, $32_3$, $32_4$, $32_5$, $32_6$, $32_7$, and $32_8$. The permanent magnets 32 are facing the first active surfaces 20 of the teeth 18 with alternating polarity, so that adjacent magnets have surfaces facing the first active surfaces 20 with opposite polarities to each other. The second rotor 16 has a series of second permanent magnets 34 facing the second active surfaces 22 of the teeth 18. In the illustrated example, the second rotor 16 has 10 permanent magnets labeled with $34_1$, $34_2$, $34_3$, $34_4$, $34_5$, $34_6$, $34_7$, $34_8$, $34_9$, and $34_{10}$. The surfaces of the permanent magnets 34 facing the second active surfaces 22 of the teeth 18 have alternating polarity, so that two adjacent permanent magnets 34 have surfaces facing the second active surfaces 22 with opposite polarities.

In operation as a motor, the coils 28, 30 of the first stator winding 24 and of the second stator winding 26 are supplied with alternating currents. The power supply of the coils 28, 30 can be single-phase or polyphase. Preferably, the coils 28, 30 of the windings 24, 26 are supplied with three-phase currents. The coils of each pair $28_i'$, $28_i''$, and $30_i'$, $30_i''$ belong to the same phase. In the example of three-phase windings with 12 coils, each phase comprises two pairs of coils, with the coils of each pair offset from each other by 180°. An example of a configuration of three-phase windings is represented in the following table.

|  | First phase | Second phase | Third phase |
| --- | --- | --- | --- |
| First winding 24 | $28_1'$, $28_1''$ $28_2'$, $28_2''$ | $28_5'$, $28_5''$ $28_6'$, $28_6''$ | $28_3'$, $28_3''$ $28'_4$, $28''_4$ |
| Second winding 26 | $30_1'$, $30_1''$ $30_2'$, $30_2''$ | $30_5'$, $30_5''$ $30_6'$, $30_6''$ | $30_3'$, $30_3''$ $30_4'$, $30_4''$ |

The coils of each phase can be connected in series or in parallel to the same phase conductor.

In FIGS. 6, 7 and 8, the directions of circulation of the currents in the coils 28, 30 in a generic instant are indicated by a point and a cross. The point represents a current leaving the plane of representation and the cross indicates an incoming direction in the plane of representation. The current circulating in the coils 28, 30 produce respective alternating magnetic fields. In FIGS. 7 and 8, an arrow indicates the direction of the magnetic field in each coil 28, 30 in a certain instant. The magnetic field produced by each coil 28, 30 is concatenated with both the permanent magnets 32 of the first rotor 14 and with the permanent magnets 34 of the second rotor 16. Each coil produces a torque contribution both on the first rotor 14 and on the second rotor 16. The interaction between the magnetic field produced by each coil 28, 30 and the magnets 32, 34 may produce a positive or negative torque contribution. A positive torque contribution is defined as that generated by concordant magnetic fields and a negative torque contribution is that generated by discordant magnetic fields.

With reference to FIG. 7, the coils 28 of the first stator winding 24 are arranged so that the two coils $28_i'$, $28_i''$ of each pair produce concordant torque contributions (both positive or both negative) on the respective permanent magnets 32 of the first rotor 14, and discordant torque contributions (one positive, the other negative or vice versa) on the respective permanent magnets 34 of the second rotor 16.

For example, it is evident in FIG. 7 that the coils from the same pair $28_1'$, $28_1''$ both produce a positive torque contribution on the magnets $32_1$, $32_5$ of the first rotor 14. The coil $28_1'$ produces a positive torque contribution on the permanent magnet $32_1$ of the second rotor 16, while the coil of the same pair $28_1''$ produces a negative torque contribution on the permanent magnet $34_6$ of the second rotor 16. This applies to all coils 28 of the first stator winding 24.

If the coils $28_i'$, $28_i''$ of each pair generate discordant torque contributions, the resulting torque of each pair of coils $28_i'$, $28_i''$ is zero. Thus, the pairs of coils $28_i'$, $28_i''$ all produce zero resultant torque on the second rotor 16. The pairs of coils $28_i'$, $28_i''$ instead produce non-zero resultant torque on the first rotor 14. Consequently, the first stator winding 24 produces an overall zero torque on the second rotor 16 and an overall non-zero torque on the first rotor 14.

With reference to FIG. 8, the two coils $30_i'$, $30_i''$ of each pair of coils of the second stator winding 26 produce concordant torque contributions on the second rotor 16 and discordant torque contributions on the first rotor 14. Therefore, the overall torque applied by the second stator winding 26 on the first rotor 14 is zero, while the overall torque applied to the second rotor 16 is not zero.

The two rotors 14, 16 are therefore independent of each other from an electromagnetic point of view, except for the cogging torque. In fact, the first rotor 14 is subject to the cogging torque due to the rotation of the second rotor 16, and vice versa. However, the cogging torque is a torque with zero mean valve and low intensity (±2.5 Nm).

A particularly important characteristic for obtaining the absence of electromagnetic interactions between the two rotors 14, 16 is the choice of the number of teeth 18 of the stator 12 and of the numbers of poles of the rotors 14, 16. In the illustrated example, the combination of 12 teeth/8 poles for the first rotor 14, and 12 teeth/10 poles for the second rotor is particularly advantageous because it renders virtually zero the electromagnetic interaction between the two rotors 14, 16. This is valid for any multiple integer of said teeth/poles pairs. Thus, a particularly advantageous choice for the number of teeth 18 of the stator 12 and the numbers of poles of the rotors 14, 16 is, respectively, n12/n8 and n12/n10, where n is an integer greater than zero.

The electromagnetic independence of the rotors of the machine also applies in a generator mode. In this case, the rotation of the first rotor 14 induces concordant currents in the two coils $28_i'$, $28_i''$ of each pair of the first winding 24, and discordant currents in the two coils $30_i'$, $30_i''$ of each pair of the second winding 26. Thus, the overall current produced at the second winding 26, following rotation of the first rotor 14, is zero, while the overall current produced by the first winding 24, following rotation of the first rotor 14, is not zero. Similarly, the rotation of the second rotor 16 induces concordant currents in the two coils $30_i'$, $30_i''$ of each pair of the second winding 26 and discordant currents in the two coils $28_i'$, $28_i''$ of each pair of the first winding 24. Thus, following rotation of the second rotor 16, the overall current produced by the first winding 24 is zero, while the overall current produced by the second winding 26 is not zero.

The machine 10 can also operate with a rotor that operates as a motor and with the other rotor that operates as a generator, and in this case as well, the two rotors 14, 16 are electromagnetically independent of each other.

Figure 5:
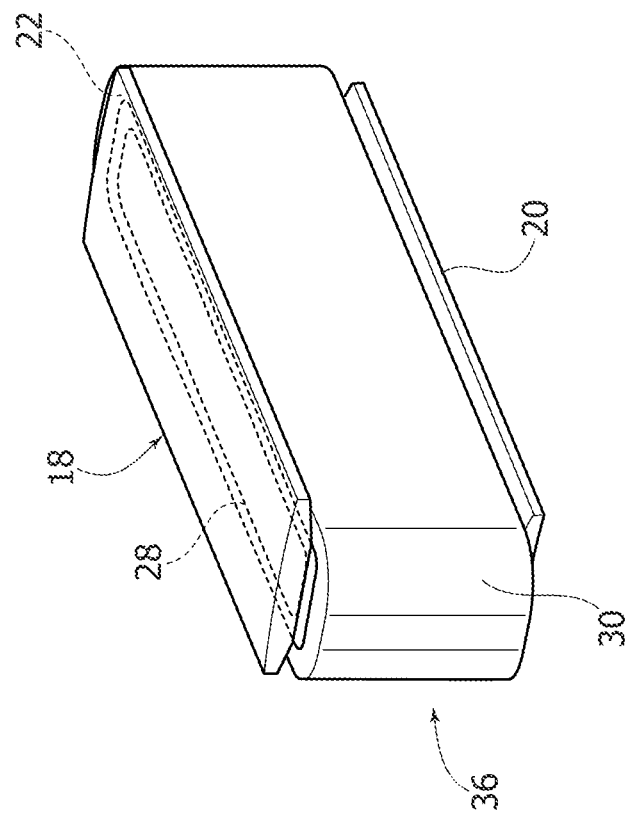
FIG. 5 illustrates the tooth di FIG. 4 with the relative coils of the stator windings.

As illustrated in FIG. 5, each tooth 18 carries a respective coil 28 of the first stator winding 24 and a respective coil 30 of the second stator winding 26. The coils 28, 30 are arranged concentrically to each other around a central part of the tooth 18. Each tooth with the respective coils 28, 30 forms a modular tooth unit 36.

With reference to FIG. 3, the stator 12 comprises a frame made of nonmagnetic material 38, which carries the various modular tooth units 36. The frame 38 is formed by hollow tubular elements, within which a coolant is made to circulate, which circulates in the direction indicated by the arrows.

Figure 9:
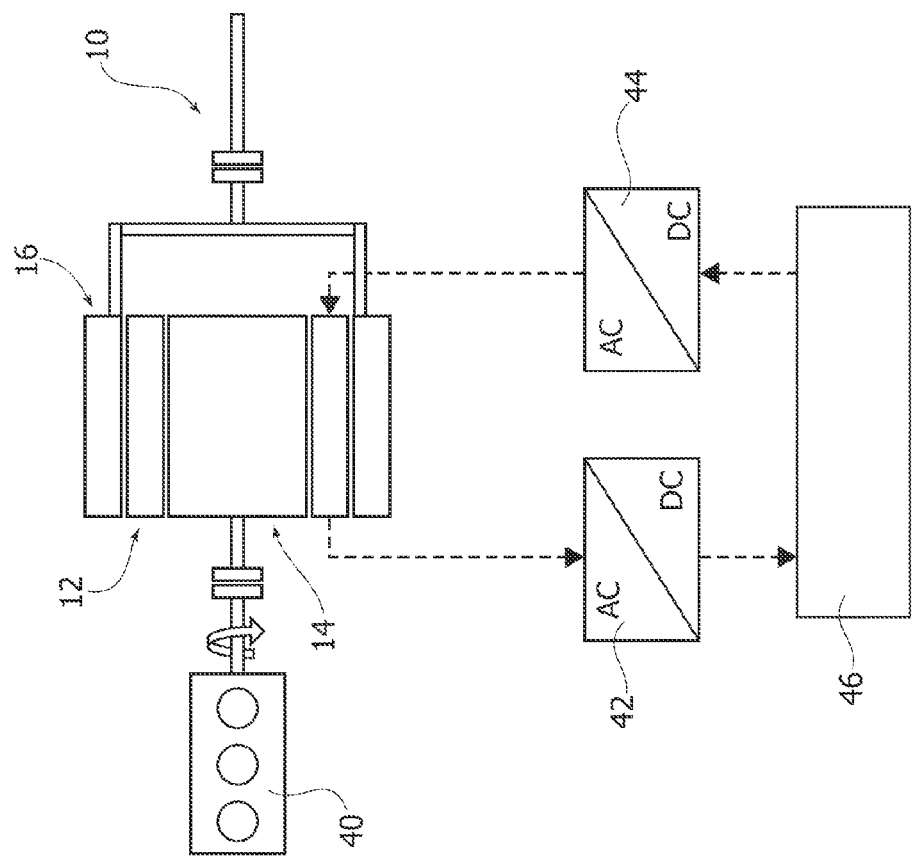
FIGS. 9 and 10 are schematic views illustrating two schemes of continuously variable transmission for vehicles using the machine according to the present invention.

FIG. 9 illustrates the use of the electric machine 10 according to the present invention as a continuously variable transmission in a vehicle equipped with an internal combustion engine 40. In the illustrated example in FIG. 9, the heat engine 40 is connected to the first rotor 14. The second rotor 16 is connected to the driving wheels through a gearbox or a fixed ratio reducer. The first stator winding 24 is connected to a first inverter 42 and the second stator winding 26 is connected to a second inverter 44. The two inverters 42, 44 are connected to a battery pack 46. The first rotor 14 and the first stator winding 24 operate as a synchronous alternating current generator. The first inverter 42 converts the alternating current produced by the first stator winding 24 into continuous current, which is utilized to charge the battery pack 46. The second inverter 44 converts the current coming from the battery pack 46 into alternating current that powers the second stator winding 26, which drives in rotation the second rotor 16. In this configuration, the internal combustion engine 40 can be made to operate at a completely independent speed from the user's requests. The internal combustion engine 40 can therefore operate in operation points of maximum efficiency.

Figure 10:
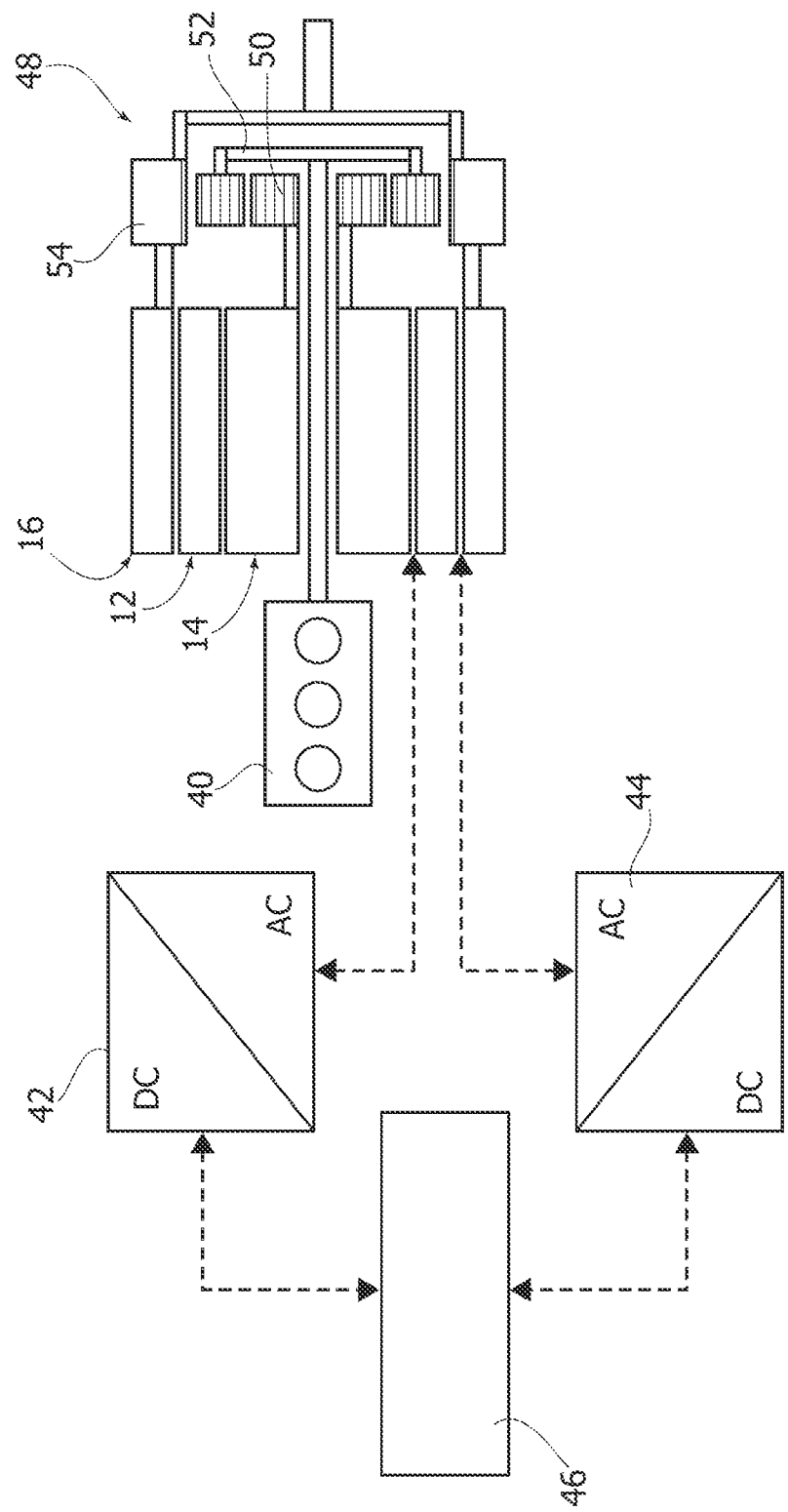

In FIG. 10, a different configuration is illustrated for the use of the electric machine 10 according to the present invention as a continuously variable transmission. In this case, an epicyclic gear train 48 is provided having a sun gear 50, a carrier 52 and an outer ring 54. The heat engine 40 is connected to the carrier 52, the first rotor 14 is connected to the sun gear 50 and the second rotor 16 is connected to the outer ring 54. In this case as well, there are two inverters 42, 44 connected to a battery pack 46. The outer ring 54 is connected to the wheels of the vehicle, possibly with the interposition of a further reduction stage.

In both configurations, the inverters 42, 44 are controlled by an electronic control unit which drives the inverters 42, 44 to provide the speed and the torque required by the user.

Figure 11:
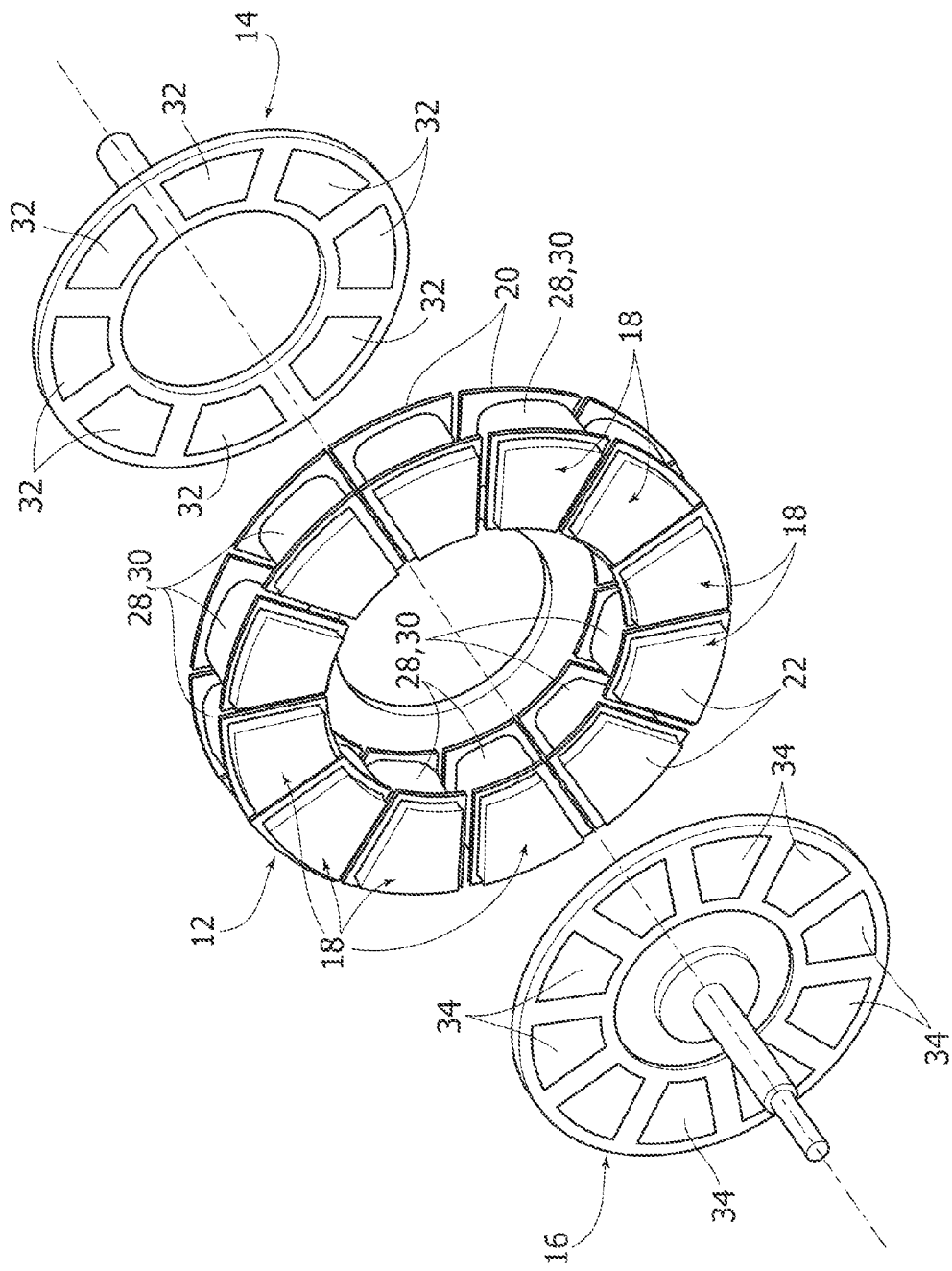
FIG. 11 is a schematic perspective view illustrating a machine according to the present invention with an axial flux arrangement.

FIG. 11 schematically illustrates an electric machine according to the present invention with an axial flux arrangement. The elements corresponding to those previously described are indicated by the same reference numerals. The stator 12 comprises a plurality of teeth 18 with respective active surfaces orthogonal to the axis of rotation A. The first and the second rotors 14, 16 are formed by discs carrying the permanent magnets 32, 34 facing the active surfaces opposite to the stator 12. The two rotors 14, 16 are rotatable, independently of each other, around the axis A. Using the same combination of stator teeth and magnetic poles of the rotors and the same arrangement of the stator windings, electromagnetic independence of the two rotors 14, 16 is obtained, as previously described.

Of course, without prejudice to the principle of the invention, the details of construction and the embodiments may vary widely with respect to those described and illustrated here, without departing from the scope of the invention as defined by the claims that follow.

What is claimed is:

1. A synchronous electric machine comprising:
a stator including a plurality of teeth arranged at equal angular intervals and having first and second active surfaces,
a first stator winding having a series of first coils wound on said teeth,
a second stator winding having a series of second coils wound on said teeth,
a first rotor having a series of first permanent magnets arranged at equal angular intervals with alternate polarities and facing said first active surfaces,
a second rotor having a series of second permanent magnets arranged at equal angular intervals with alternate polarities and facing said second active surfaces,
wherein the first and the second rotors are supported in rotation, independently of each other, around a common axis,
wherein the first coils and the second coils of each stator winding are arranged in pairs, with two coils of each pair offset from each other by a predetermined angle,
wherein, during operation as a motor, two first coils of each pair produce concordant torque contributions on the first rotor and discordant torque contributions on the second rotor and two second coils of each pair produce concordant torque contributions on the second rotor and discordant torque contributions on the first rotor,
wherein each of said teeth carries a respective first coil and a respective second coil, and
wherein the stator has a number of (n)(12) teeth, the first rotor has a number of (n)(8) permanent magnets and the second rotor has a number of (n)(10) second permanent magnets, where n is an integer greater than zero.

2. A vehicle comprising an internal combustion engine and a continuously variable transmission including an electric machine according to claim 1.

3. The vehicle according to claim 2, including a battery pack and a first and a second inverter connected to the battery pack and to respective stator windings.

4. The vehicle according to claim 2, wherein the internal combustion engine is connected to the first rotor and wherein the second rotor is connected to driving wheels.

5. The vehicle according to claim 2, comprising an epicyclic gear train including a sun gear, a carrier and an outer ring, wherein the internal combustion engine is connected to the carrier, the first rotor is connected to the sun gear and the second rotor is connected to the outer ring and wherein the outer ring is connected to the driving wheels.

6. A synchronous electric machine, comprising:
a stator including a plurality of teeth arranged at equal angular intervals and having first and second active surfaces,
a first stator winding having a series of first coils wound on said teeth,
a second stator winding having a series of second coils wound on said teeth,
a first rotor having a series of first permanent magnets arranged at equal angular intervals with alternate polarities and facing said first active surfaces,
a second rotor having a series of second permanent magnets arranged at equal angular intervals with alternate polarities and facing said second active surfaces, wherein the first and the second rotors are supported in rotation, independently of each other, around a common axis, wherein the first coils and the second coils of each stator winding are arranged in pairs, with two coils of each pair offset from each other by a predetermined angle, wherein, during operation as a motor, two first coils of each pair produce concordant torque contributions on the first rotor and discordant torque contributions on the second rotor and two second coils of each pair produce concordant torque contributions on the second rotor and discordant torque contributions on the first rotor, wherein each of said teeth carries a respective first coil and a respective second coil, wherein the stator has a number of (n)(12) teeth, the first rotor has a number of (n)(8) permanent magnets and the second rotor has a number of (n)(10) second permanent magnets, where n is an integer greater than zero, and wherein the stator has a shape of an annular ring and wherein the first rotor and the second rotor are arranged coaxially within and, respectively, outside of the stator.

7. A synchronous electric machine, 4 comprising:

a stator including a plurality of teeth arranged at equal angular intervals and having first and second active surfaces, a first stator winding having a series of first coils wound on said teeth, a second stator winding having a series of second coils wound on said teeth, a first rotor having a series of first permanent magnets arranged at equal angular intervals with alternate polarities and facing said first active surfaces, a second rotor having a series of second permanent magnets arranged at equal angular intervals with alternate polarities and facing said second active surfaces, wherein the first and the second rotors are supported in rotation, independently of each other, around a common axis, wherein the first coils and the second coils of each stator winding are arranged in pairs, with two coils of each pair offset from each other by a predetermined angle, wherein, during operation as a motor, two first coils of each pair produce concordant torque contributions on the first rotor and discordant torque contributions on the second rotor and two second coils of each pair produce concordant torque contributions on the second rotor and discordant torque contributions on the first rotor, wherein the stator has a number of (n)(12) teeth, the first rotor has a number of (n)(8) permanent magnets and the second rotor has a number of (n)(10) second permanent magnets, where n is an integer greater than zero, wherein the stator has a shape of an annular ring and wherein the first rotor and the second rotor are arranged coaxially within and, respectively, outside of the stator, and wherein the stator comprises a frame carrying a plurality of modular tooth units each of which comprises a tooth, a first coil and a second coil.

8. The electric machine according to claim 6, wherein said teeth have active surfaces parallel to each other and orthogonal to the axis of rotation and wherein the first and the second rotors are disc-shaped, facing frontally said active surfaces.

9. A synchronous electric machine, comprising:

a stator including a plurality of teeth arranged at equal angular intervals and having first and second active surfaces, a first stator winding having a series of first coils wound on said teeth, a second stator winding having a series of second coils wound on said teeth, a first rotor having a series of first permanent magnets arranged at equal angular intervals with alternate polarities and facing said first active surfaces, a second rotor having a series of second permanent magnets arranged at equal angular intervals with alternate polarities and facing said second active surfaces, wherein the first and the second rotors are supported in rotation, independently of each other, around a common axis, wherein the first coils and the second coils of each stator winding are arranged in pairs, with two coils of each pair offset from each other by a predetermined angle, wherein, during operation as a motor, two first coils of each pair produce concordant torque contributions on the first rotor and discordant torque contributions on the second rotor and two second coils of each pair produce concordant torque contributions on the second rotor and discordant torque contributions on the first rotor, wherein the stator has a number of (n)(12) teeth, the first rotor has a number of (n)(8) permanent magnets and the second rotor has a number of (n)(10) second permanent magnets, where n is an integer greater than zero, wherein the stator has a shape of an annular ring and wherein the first rotor and the second rotor are arranged coaxially within and, respectively, outside of the stator, wherein the stator comprises a frame carrying a plurality of modular tooth units each of which comprises a tooth, a first coil and a second coil, and wherein said frame comprises tubular elements forming a circuit for the circulation of coolant.

* * * * *